United States Patent
Saboune et al.

(10) Patent No.: US 9,711,015 B2
(45) Date of Patent: Jul. 18, 2017

(54) CUSTOMIZING HAPTIC FEEDBACK IN LIVE EVENTS

(71) Applicant: Immersion Corporation, San Jose, CA (US)

(72) Inventors: Jamal Saboune, Montreal (CA); Juan Manuel Cruz-Hernandez, Montreal (CA); Liwen Wu, Verdun (CA); Abdelwahab Hamam, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/855,728

(22) Filed: Sep. 16, 2015

(65) Prior Publication Data

US 2017/0076565 A1 Mar. 16, 2017

(51) Int. Cl.
*H04B 3/36* (2006.01)
*G08B 6/00* (2006.01)

(52) U.S. Cl.
CPC ..................................... *G08B 6/00* (2013.01)

(58) Field of Classification Search
CPC .... G06F 3/011; G06F 3/016; G06F 2203/013; A63F 2300/1037; G08B 6/00
USPC ....................................... 340/407.1; 434/114
See application file for complete search history.

(56) References Cited

U.S. PATENT DOCUMENTS

| 7,911,328 | B2 | 3/2011 | Luden et al. | |
| 2009/0128306 | A1 | 5/2009 | Luden et al. | |
| 2009/0167509 | A1* | 7/2009 | Fadell | G06F 3/016 340/407.2 |
| 2010/0152620 | A1 | 6/2010 | Ramsay et al. | |
| 2015/0289034 | A1* | 10/2015 | Engman | G09F 27/00 340/870.07 |
| 2015/0350146 | A1* | 12/2015 | Cary | H04W 4/22 709/206 |

FOREIGN PATENT DOCUMENTS

| EP | 2779706 A1 | 9/2014 |
| EP | 2840463 A1 | 2/2015 |
| WO | 2004111819 A1 | 12/2004 |

\* cited by examiner

*Primary Examiner* — Thomas Mullen
(74) *Attorney, Agent, or Firm* — Miles & Stockbridge P.C.

(57) ABSTRACT

A method of generating event identifiers includes receiving sensor information from tracked entities. Based on the sensor information for tracked entities, an event can be determined. An event ID can be assigned to the event based on the type of event that was determined. The event ID can be sent to a haptically enabled device, the device outputting a haptic effect determined from the event ID.

26 Claims, 10 Drawing Sheets

CUSTOMIZING HAPTIC FEEDBACK IN LIVE EVENTS

FIELD

One embodiment is directed to a haptic output system. More particularly, one embodiment is directed to a haptic output system that can output haptics based on sensor information.

BACKGROUND INFORMATION

Audiences generally appreciate immersive entertainment, such as big screens, sophisticated sound effects, and so forth. Sensors can be added to participants in a live event and haptic effects, such as vibratory haptic effects, can be provided to viewers based on sensor output.

Conventional systems provide haptic information from sensors based on raw sensor data. For example, if a sensor is struck or otherwise impacted, a vibration corresponding to the impact characteristics of the sensor could be provided to a viewer or audience member.

SUMMARY

Embodiments include a method of generating event identifiers, where the method includes receiving sensor information from tracked entities. Based on the sensor information for tracked entities, an event can be determined. An event ID can be assigned to the event based on the type of event that was determined. The event ID can be sent to a haptically-enabled device, the device outputting a haptic effect determined from the event ID.

DETAILED DESCRIPTION

Figure 1:
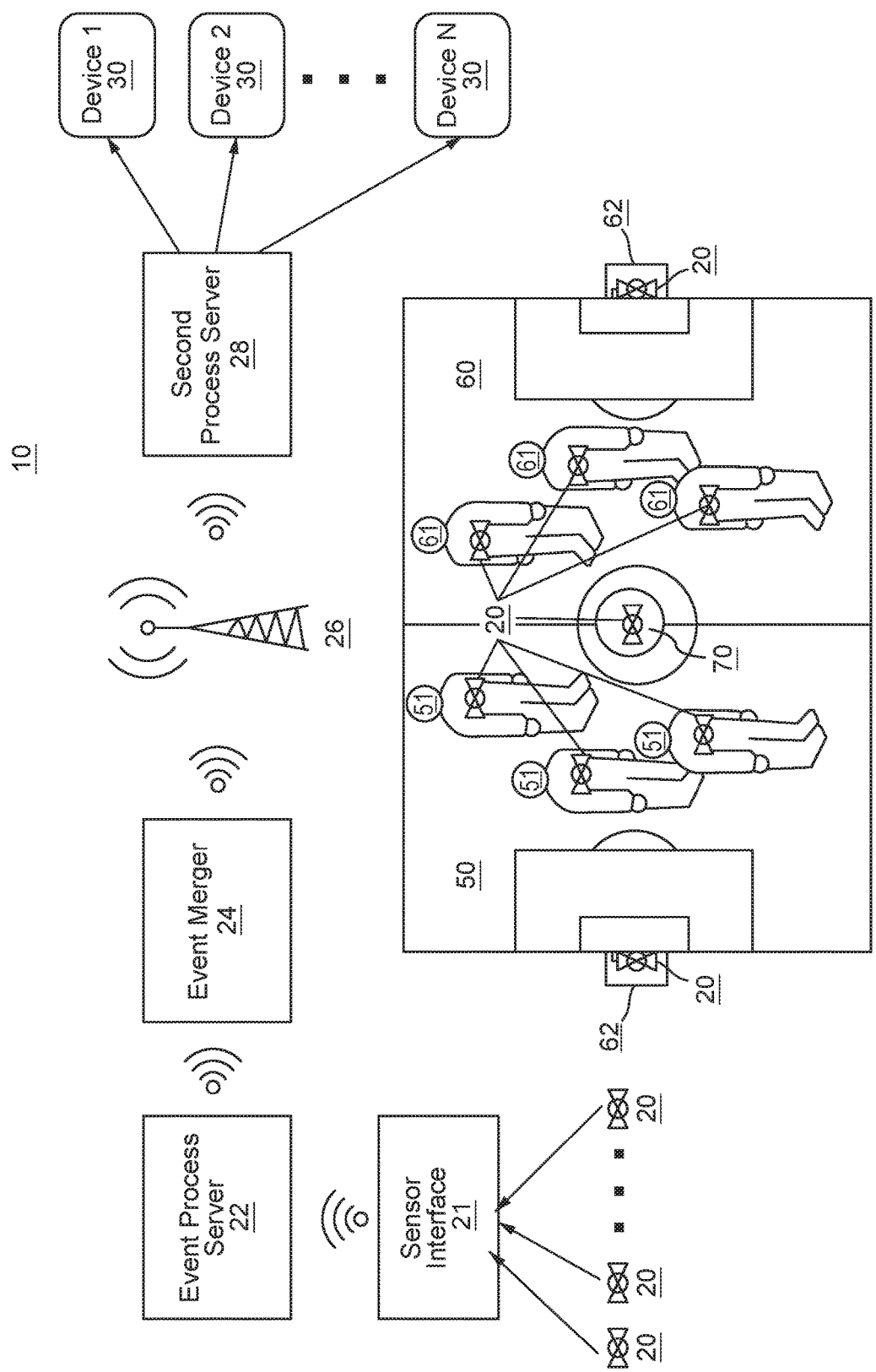
FIG. 1 is a block diagram of a haptically-enabled system in accordance with one embodiment of the present invention.

Embodiments allow viewers or an audience of an event, such as a home viewer of a sporting event, to experience the event more immersively by providing haptic feedback to the audience member based on action happening at the event. For example, haptic feedback provided to an audience member when a player makes a tackle can give the audience member an enhanced viewing experience.

Embodiments described below provide an audience member (i.e., a user) the opportunity to receive haptic feedback related to the happenings at the event. In addition, embodiments allow the user to provide preferences that indicate a source for generating the feedback. In other words, the user can provide preferences that select which events to receive haptic feedback for based on who is performing the action or what action is being performed. The user can select which entity they want to follow, whether it is a group entity such as a whole team in a match, or a single entity such as a single player in a sports event. For example, a user can receive feedback for events relating to an entity, object, a player, a team, and so forth by specifying the classification or source of events the user is interested in. In addition, embodiments can provide sensor tracking of entities, objects, players, persons, and so forth. Based on the sensor output, embodiments can determine an event corresponding to the sensor output and assign that event an identifier ("ID").

Embodiments therefore do not directly translate a sensed action into a haptic effect. Potential problems with directly converting sensor readings into haptic effects can include connectivity issues, a potential loss of information, and synchronization issues. Connectivity issues can arise due to a requirement for large transmission bandwidth to provide sensor information from wirelessly connected sensors into a haptics output engine. This can also lead to a loss of information and a decrease in haptic quality, especially when a lot of sensor data is being transmitted at once, because there can be drops in data transmission. Synchronization issues can also develop between haptics and video/audio data resulting from transmission latency or other issues. Determining an event identifier associated with the sensed actions requires much less bandwidth than raw sensor data and can be accomplished in a live environment.

In some embodiments, the source of the sensor information can be classified and the classification information can be included as metadata to the event ID. The metadata can include a classification ID or source ID or an ID type corresponding to the classification or source. For example, in a sporting event, sensors located on each player can be identified by a sensor ID and the sensor ID(s) on each player can be associated together as a player ID. The player ID can be associated with the event ID to indicate which players are involved in the particular event.

Classification can also include hierarchical arrangements. For example, a source classification can include a player ID and a team ID, where the team ID is determined depending on which team the player is on and where multiple players can be associated with the same team ID. In another example, a classification can include "scoring objects" and a sub-classification can include a "ball" or "team goal." In the former example, if a player tackles another player in a football game, an event ID for tackling can be created along with a classification ID or source ID for each team and each player. In the latter example, if the ball crosses the goal line, an event ID for scoring can be created along with classification or source ID for the team goal, ball, and player carrying the ball when the ball crosses the goal line.

Embodiments can send the event ID (and optional classification or source ID) information to remote users watching through, for example, a handheld device with a haptic output device or a television while interacting with a wearable device that contains a haptic output device. In some embodiments, event IDs (and optional classification or source IDs) can be merged with broadcast data as a subchanneled, multiplexed, or additional stream to the broadcast data. In some embodiments, event IDs (and optional classification or source IDs) can be merged together into a multi-channel stream that can be sent and received over any available wireless technologies, such as Wi-Fi, Bluetooth, and so forth.

Embodiments can use the event ID (and optional classification or source IDs) information to map the event information to a corresponding haptic effect. For example, an event ID can be an identifier that corresponds to a tackle event with an intensity level of three. The event ID can be used to find haptic effect information to be played on a haptic output device, such as a haptic playback track or other such information to cause the haptic output device to generate a haptic effect as feedback based on the event ID.

As used herein, a wearable device is any device that can be worn by a user and that is in contact directly or indirectly, permanently or intermittently, with a user's body part. A graspable (by the hand) device is also considered a wearable device even if it is only "wearable" so long as it is grasped, such as an arm rest of a chair or a phone.

FIG. 1 is a block diagram of a haptically-enabled system 10 in accordance with one embodiment of the present invention. System 10 includes sensors 20 that can be attached to or integrated with entities, objects, persons, players, and the like at an event. Each of the sensors can include a sensor ID so that sensor information provided by the sensor includes which sensor provided the sensor information. Sensor IDs can be correlated with the name of the entity, player, person, object, and the like. For example, a sensor ID "ABC" can correspond to a sensor placed on "A. Team Player." Sensor information received from sensor ID "ABC" can be assigned to "A. Team Player." Discussed in more detail below, the assignment of a sensor ID to a list of entities, objects, persons, players, and the like, allows a classification or source to be determined for events that are found from sensor data. When an event occurs, sensors can be used to identify the event, and who and/or what was involved in the event.

Sensors 20 can include temperature/humidity/atmospheric pressure sensors to capture environmental conditions, an inertial field measurement unit ("IMU") with accelerometer, gyroscope, and magnetometer to characterize the motion, velocity, acceleration and orientation of the entity, a microphone to capture voice or environmental audio information, bio-sensors (e.g., blood pressure sensors, skin resistance, etc.). Sensors can use wireless transceivers/transmitters (not pictured) to receive/transmit information from/to other devices wirelessly. One of skill in the art will understand that sensors can be used individually or in any combination.

System 10 includes an event process server 22 that receives sensor information and determines an event from the sensor information. Event process server 22 can use sensor information to determine what kind of event took place. An event ID can be assigned to the event. For example, sensor information can be analyzed by event process server 22 to determine that Player 3 from Team A scored a touchdown by a lunge across the goal line. An event ID can be assigned to that event so that, rather than transmit information specifying a haptic feedback effect directly, the event ID can be used at the user's end and cause an appropriate haptic effect to play on the haptic output device. Examples of event categories include a ball being hit, scoring, tackling, and so forth. Event IDs can be assigned to any event, such as anything out of the ordinary flow that can be advantageous to provide haptic effects for. The transformation from event to event ID can be made by determining an event category based on the sensor information and then determining the type of event that is within that category. For example, in a football game sensor information can be used to determine that a ball movement event took place by analyzing information from a sensor placed on the football. Sensor information can be further analyzed to determine that a scoring event took place based on sensor information for the ball and sensor information for players in proximity to the ball.

Rather than determining the type of action taking place, event process server 22 can use sensor data to assign an event ID based on the sensor readings and sensor context. The event ID can be a transformation of N input sensory signals, such as acceleration (x, y, z), gyroscope (x, y, z), magnetometer (x, y, z), etc. into M outputs classifying an event ID. For example, sensor data received from a sensor ID associated with a ball can include a sudden change in acceleration and gyroscope sensor outputs. An event ID can be selected for the ball associated with the sensor ID based on the acceleration and gyroscope parameters. Thus, rather than determining that the ball had been kicked, the data can be translated more directly to an appropriate event ID while still using some context for the sensor, such as the sensor ID or other classification or source ID.

Algorithms for determining what kind of event took place can depend on the venue and type of event. Events associated with football games would be different than events associated with golf or soccer. In some embodiments, sensor ID information can be used to determine the classification or source of the entity, object, person, player, or the like whose action or involvement generated the sensor information. Classification or source IDs can be assigned to the event. For example, a player dunking a basketball can be assigned a source ID for the identification of the player and a source ID for the team the player is on. In some embodiments, "source" can be substituted for the thing that is classified. For example, the source ID could be "player ID," "team ID," "goal ID," "hole ID," "object ID," "sideline ID," and so forth.

In team sporting events, for example, each team can be identified with a team ID. A player ID associated with one or more sensors for each player can be provided as a sub ID to identify all the players within the team. In sports with equipment unique to each player, entity identification for a player can be based on the sensor ID for the equipment associated with that player. In sports with shared equipment, like soccer, entity sensors on players can identify players and an entity sensor on the ball can identify actions and events related to the ball (and the players near the ball when the event occurs).

In some embodiments, sensor information 20 can be merged together into a multichannel feed prior to being received by the event process server. For example, a sensor interface 21 can receive all available sensor information, merge the sensor information together into a multichannel feed, and send it to the event process server.

As an example of the merging, suppose that all possible IDs in a given broadcasting event can be represented for example as: Player ID1, Player ID2, . . . , Player ID_N, team ID1, team ID2, Object ID1, Object ID2, . . . Object ID_N. Not all sensors objects, players, etc., however, necessarily trigger an event and therefore sensor interface 21 might not receive all IDs at a given time. Interface 21 will generally only receive the IDs that are "active." In other words, sensors can be configured to not send data until the data meets a certain threshold value for each sensor. From list of all possible IDs, now suppose interface 21 receives the following IDs: Player ID2, Team ID1, Object ID1, Object ID2. Sensor interface 21 can merge these IDs into a single packet by, for example concatenating the different IDs. One possible implementation is illustrated by the following example packet format of FIG. 6.

Figure 6:
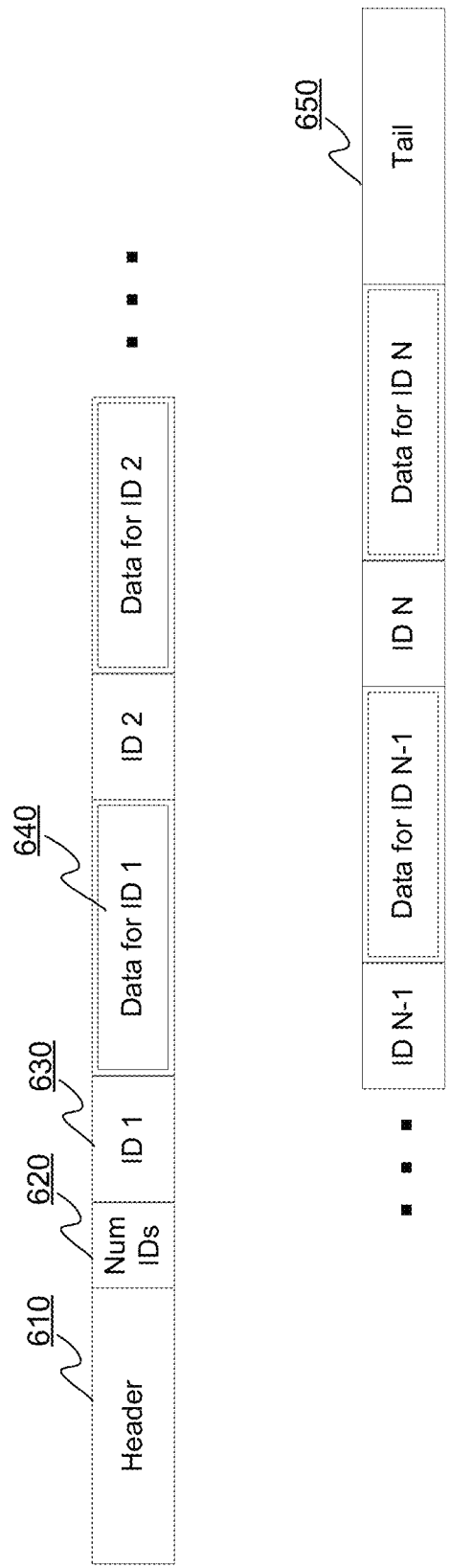
FIG. 6 illustrates an example merged sensor packet format in accordance with some embodiments.

FIG. 6 illustrates an example merged sensor packet format in accordance with some embodiments. Element 610 is a packet header that can contain information about the packet and communication protocol for the packet, such as overall length, encoding, rate, and the like. Element 620 is a field for indicating the number of IDs being transmitted in the packet. Element 630 is a field for the first ID corresponding to one of the active IDs in the event. Element 640 is a field for data for the first ID. This data would correspond to data particular to the sensor. The IDs and data repeat until the last data field. Element 650 is a packet tail field indicating the end of the packet. The packet can be transmitted using known wireless technologies, such as WiFi, Bluetooth, or mobile data network technologies.

In the list of active IDs from above, Player ID2, Team ID1, Object ID1, and Object ID2, the first ID 630 would correspond to Player ID2, the second ID would correspond to Team ID1, the third ID would correspond to Object ID1, and the fourth ID would correspond to Object ID2. Note that this implementation considers how the packets can be created in order to transmit the information from sensor interface 21 to event processor server 22. One of skill will understand that the packet can be arranged in any other way suitable for a particular implementation and that the arrangement discussed in relation to FIG. 6 is merely one example.

One purpose of the merging is to reduce the communication time and/or bandwidth between sensor interface 21 and event processor 22. In one embodiment, sensor interface 21 can capture data 20 at a fast rate, create a bundle of sensor information, and transmit it at a lower rate (e.g., perhaps at a rate at which television information is regularly broadcast).

Having a sensor interface local to the place where the sensors are located can be convenient. With a local sensor interface, transmission energy required from each sensor can be reduced. Event process server 22 can be located locally or remotely, as desired. Also, in some embodiments, multiple sensors can be grouped together, for example, by source or classification. For example, in the case where a player has multiple entity sensors, information from these sensors can be grouped.

In some embodiments, the functionality of event process server 22 can be processed in a distributed manner. For example, a smart tennis racquet can contain several sensors that are processed by an event process server just for that racquet. Devices such as sports equipment can contain sensors that relay sensor information or process sensor information and provide event ID information using Bluetooth or an Internet of Things paradigm. For example, smart programmable sensors can be used that provide a remote interface and the capability to configure settings for the sensors. Sensors can be equipped with a local processor to handle some processing capabilities. In some embodiments, sensor interface 21 can serve as a configuration point for managing sensor information and provide a remote interface for changing sensor settings.

System 10 can include an event merger 24 that can merge event IDs into a multichannel feed. Each channel in the multichannel feed can correspond to a haptic channel that provides an event ID and classification or source IDs associated with the event IDs. Each channel can correspond to a particular team, player, or other entity. System 10 can include a transmitter/antenna 26 for sending event IDs. In some embodiments, the event IDs can be broadcast along with one or more audio and one or more video feeds. In some embodiments, such as where data will be streamed, the event IDs can be sent using a computer network, including wired and wireless technologies.

For many live broadcast events, a delay is purposefully added to screen for inappropriate broadcast content or bloopers. In embodiments where the processing of haptic information exceeds real-time processing (or the processing of video/audio signals), the intentional delay can be used to perform the event processing. The haptic event IDs can be synchronized to the video/audio signals, such as described below.

Figure 7:
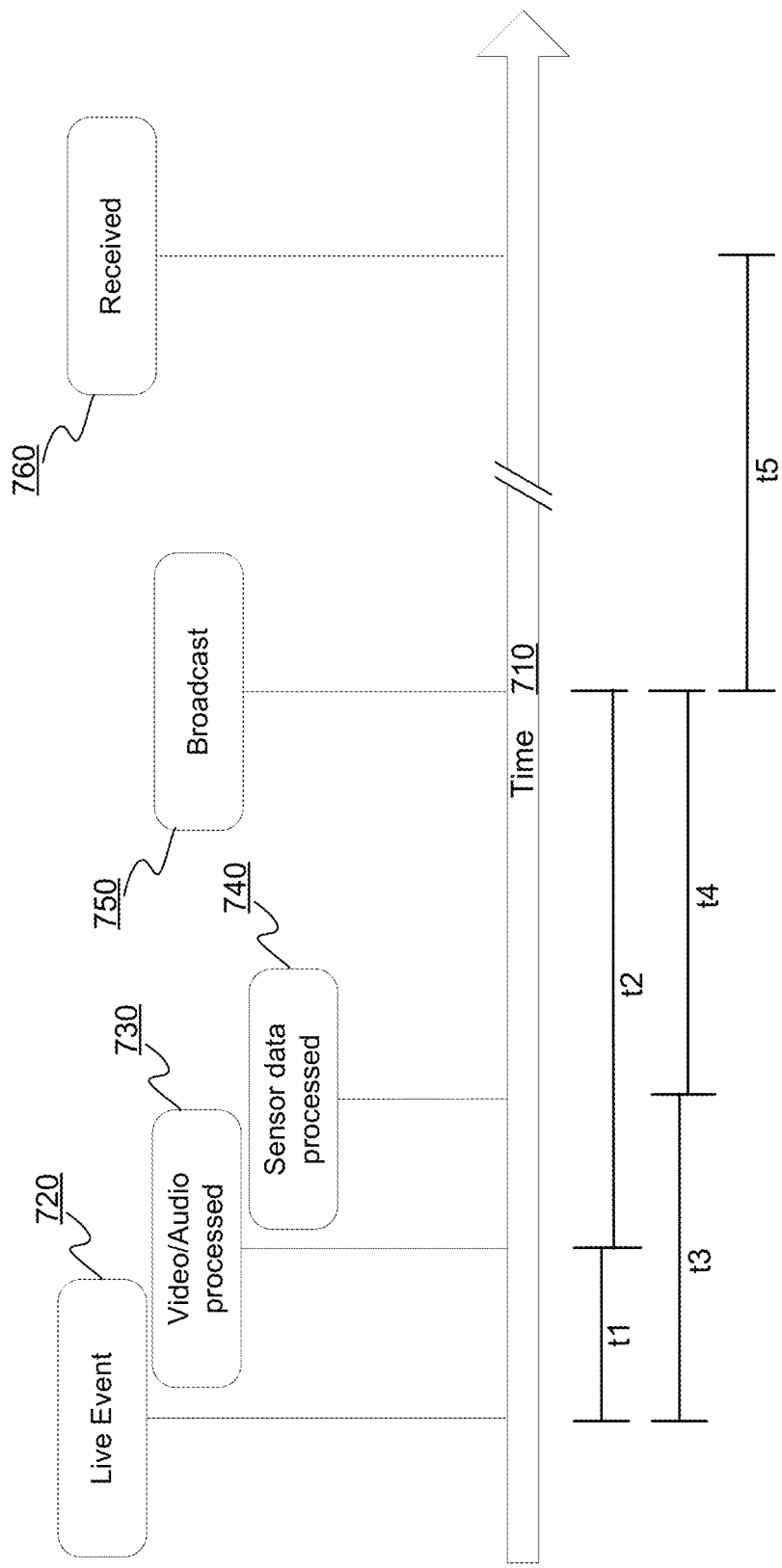
FIG. 7 is a diagram of a timeline to illustrate the synchronization of haptic event IDs with other broadcast data.

FIG. 7 is a diagram of a timeline to illustrate the synchronization of haptic event IDs with other broadcast data. Timeline 710 is a timeline of the broadcast of a signal for a live event, such as a multimedia signal with one or more video signals and one or more audio signals. A live event occurs at time 720. Video and audio for the live event is processed at time 730. Sensor data, such as data from sensor 20, is processed at time 740, including event ID assignment and merging at event merger 24. At time 750, the information including video, audio, and haptic data can be broadcast. At time 760, the information can be received. This progression of time sequences sets up particular time differences that are illustrated below timeline 710. Time t1 is the time lapse that occurs between a live event 720 and the time the video and audio associated with the event is processed and ready to be broadcast at 730. Time t2 can be a deliberate delay, such as a seven second delay that is typically used in U.S. television broadcasting. Time t3 can be the time lapse between the live event 720 and the processing of sensor data into haptic event ID information at 740. In this illustration, this processing takes longer than the video/audio processing. Thus the delay of t2 can be used to complete processing. The haptic signal and video/audio data can be synced by adding a corresponding delay to the haptic signal, t4, equal to t1+t2−t3. This same equation can be used in situations where the haptic information is processed quicker than the delay at t1, or in other words, when t3<t1. Or, where t3<t1, instead a delay equal to t1−t3 can be added to the haptic information signal, and both signals can be delayed by an optional common delay time, t2. Time t5 is the time lapse due to broadcast, which varies based on the broadcast methodology and technology. In some embodiments, where no deliberate delay is added, the video/audio signal can be delayed to sync with the haptic signal by a delay time equal to t3−t1.

In some embodiments, delay t1 can be assumed to be very close to zero as a result of real-time processing. In some embodiments, delay t2 can be assumed to be the standard seven seconds used in U.S. television broadcasting of live events. In some embodiments, delay t3 can be controlled by increasing or decreasing the number of reading rounds of the sensors for information to be analyzed. For example, when each of the reading rounds of sensors is the same duration, i.e., at the same sample rate, then increasing the number of reading rounds of the sensor will cause an increased delay when processing sensor data into event IDs.

System 10 can include a second process server 28 for receiving and processing event IDs. Process server 28 can separate merged event IDs into individual event IDs. In some embodiments, process server 28 can filter event IDs based on output preferences or device capabilities. Process server 28 can send the event IDs or filtered event IDs to devices such as device 30. Filtering based on output preferences can include a preference, for example, for event IDs associated with a particular classification or source. In some embodiments process server 28 can use classification or source IDs sent with event IDs to perform filtering based on user preferences. Using output preferences, a user can enable haptics for a team, player, event category, and so forth. The preferences can serve to filter the available event IDs to output haptic effects that correspond to the user selections in the output preferences. If multiple video or audio feeds are available, output preferences can also include a selection of a particular video or audio feed for the live event. Filtering based on device capabilities can include selecting event IDs that correspond to a haptic effects intended to be played on certain haptic output devices.

Devices, such as device 30, can receive one or more event IDs from process server 28 and determine one or more haptic effects associated with the event IDs. Device 30 can output the haptic effects as haptic feedback on a haptic output device, such as a vibrotactile or kinesthetic actuator.

In some embodiments, process server 28 or aspects of process server 28 functions described above with respect to process server 28 can be integrated into device 30. For example, in one embodiment a merged stream of event IDs can be received by device 30, which can separate the stream into individual event IDs and filter them to select filtered IDs based on output preferences on device 30.

FIG. 1 depicts a soccer field with a left half 50, a right half 60, and a soccer ball 70 as an example of the possible placement of sensors 20 of system 10 onto entities team A players 51, team B players 61, goals 62, and ball 70. As described above, sensors 20 can send sensor information to event process server 22 as the entities interact.

Figure 2:
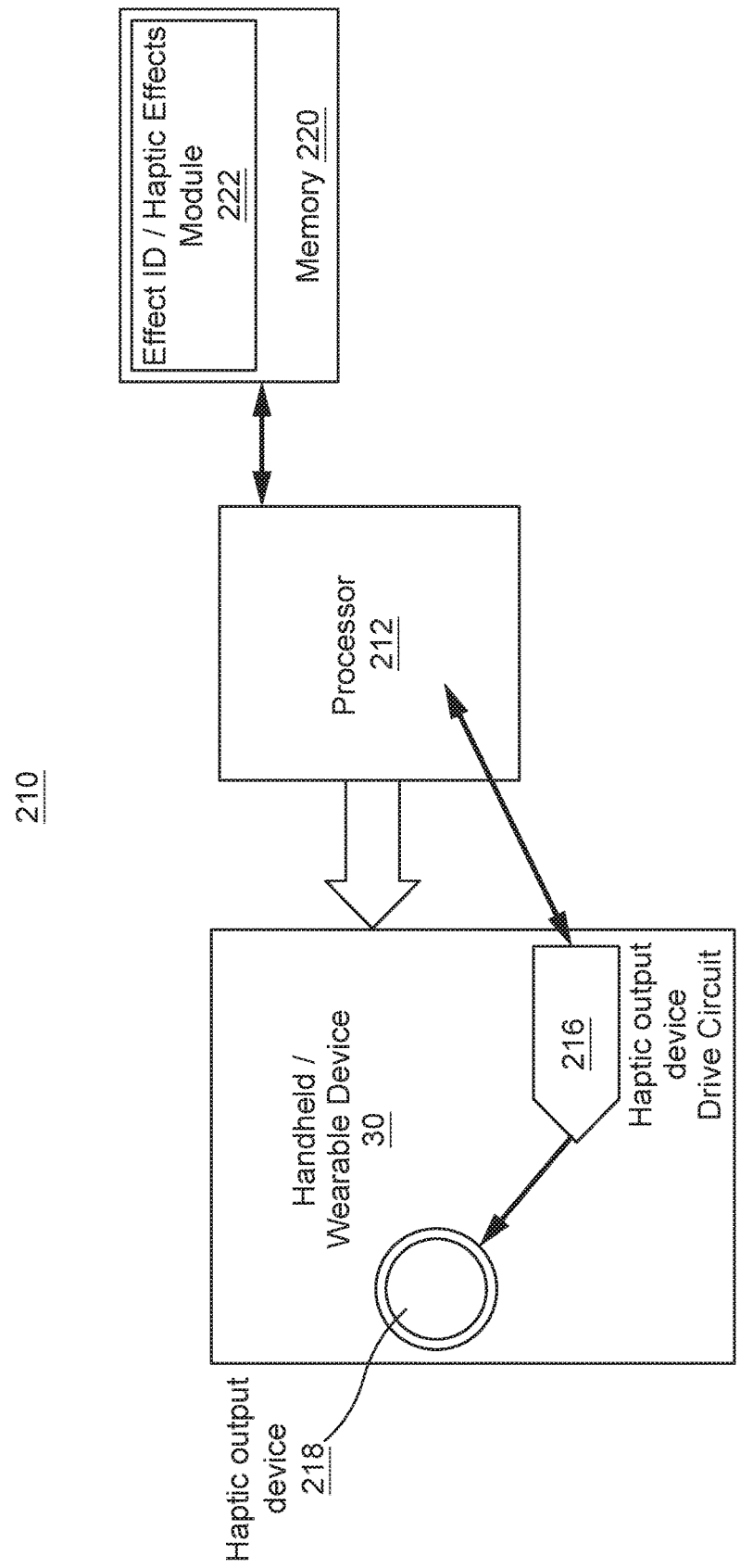
FIG. 2 is a block diagram of a haptically-enabled system in accordance with one embodiment of the present invention.

FIG. 2 is a block diagram of a haptically-enabled system 210 in accordance with one embodiment of the present invention. System 210 can include a handheld or wearable device 30 of FIG. 2 that includes a haptic output device 218. Internal to system 210 is a haptic feedback system that generates haptics on system 210. In one embodiment, a haptic effect is generated by haptic output device 218.

The haptic feedback system includes a processor or controller 212. Coupled to processor 212 is a memory 220 and a haptic output device drive circuit 216, which is coupled to a haptic output device 218 located on handheld or wearable device 30. Haptic output device 218 can include any type of haptic output device, including motors, actuators, electrostatic friction ("ESF") devices, ultrasonic frequency ("USF") devices, and any other haptic output device that can be used to provide haptic feedback to a user.

Other haptic output devices 218 may include flexible, semi-rigid, or rigid materials, including smart fluidic actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

Processor 212 may be any type of general purpose processor, or could be a processor specifically designed to provide haptic effects, such as an application-specific integrated circuit ("ASIC"). Processor 212 may be the same processor that operates the entire system 210, or may be a separate processor. Processor 212 can decide what haptic effects are to be played and the order in which the effects are played based on high level parameters. A haptic effect may be considered "dynamic" if it includes some variation in the generation of haptic effects amongst haptic output device(s) or a variation in the generation of haptic effects based on a user's interaction with handheld or wearable device 30 or some other aspect of system 210, such as user preferences that filter for certain types of event IDs.

Processor 212 outputs the control signals to haptic output device drive circuit 216, which includes electronic components and circuitry used to supply haptic output device 218 with the required electrical current and voltage to cause the desired haptic effects. System 210 may include more than one haptic output device 218, and each haptic output device may include a separate drive circuit 216, all coupled to a common processor 212. Memory device 220 can be any type of storage device or computer-readable medium, such as random access memory ("RAM") or read-only memory ("ROM"). Memory 220 stores instructions executed by processor 12. Among the instructions, memory 220 includes a haptic effects module 222 which are instructions that, when executed by processor 212, generate drive signals for haptic output device 218 that provide haptic effects corresponding to an event ID, as discussed above and disclosed in further detail below. Memory 220 may also be located internal to processor 212, or any combination of internal and external memory.

Figure 10:
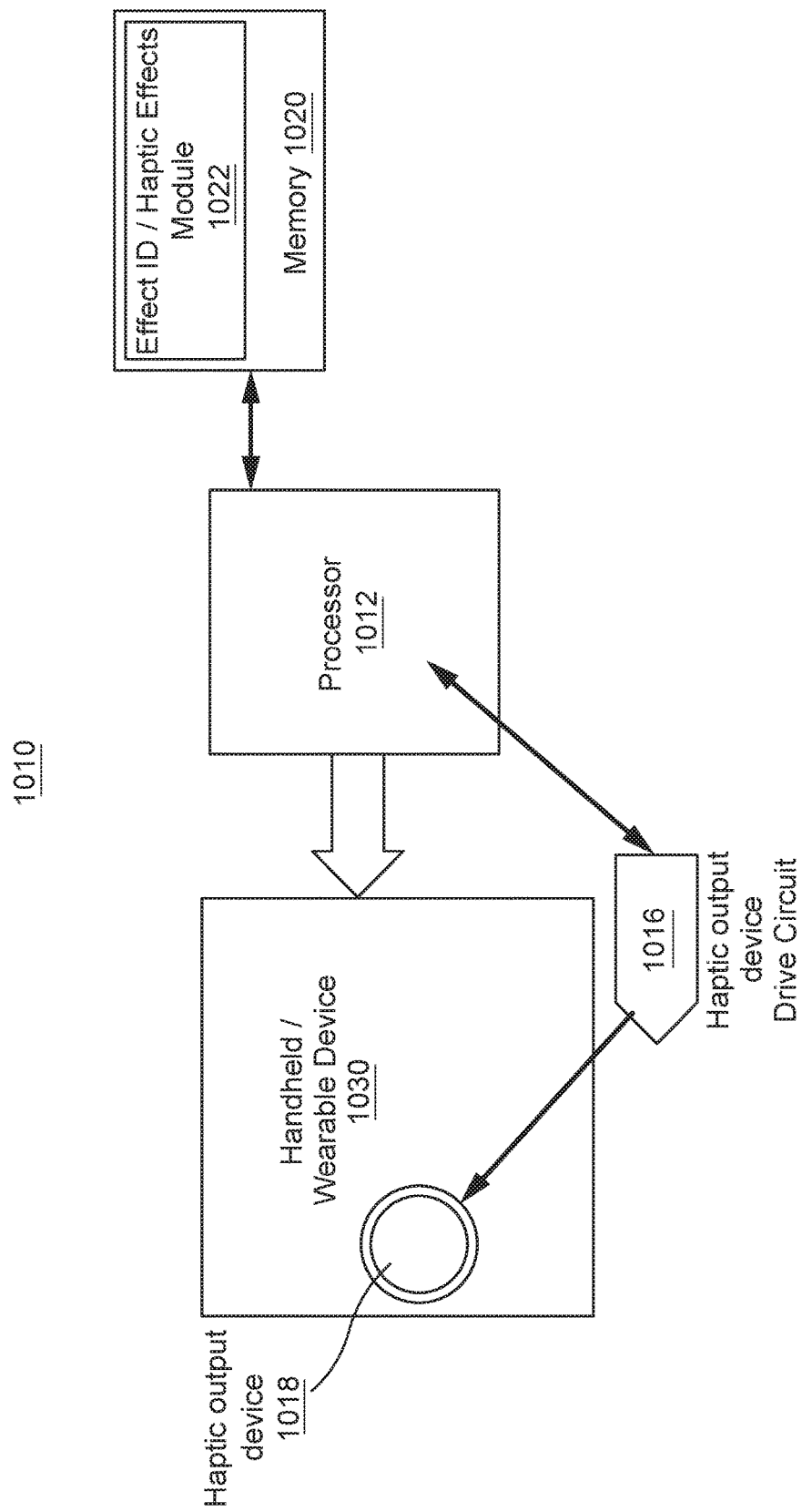
FIG. 10 is a block diagram of a haptically-enabled system in accordance with one embodiment.

FIG. 10 is a block diagram of a haptically-enabled system 1010 in accordance with one embodiment.

Elements in the haptically-enabled system 1010 that are similar to elements in the haptically-enabled system 210 shown in FIG. 2 have been referenced using like reference numerals. With the exception of the features discussed below, descriptions of the similar elements are omitted for the sake of brevity.

Referring to FIG. 10, a separate drive circuit 1016 may be separate from the handheld or wearable device 1030.

Alternatively, as shown in FIG. 2, the separate drive circuit 216 may be a component of the handheld or wearable device 30.

Although the specific embodiments discussed herein may include example events provided in order to supply example contexts of use, one of skill will understand that the techniques described in relation to each embodiment can be adapted for use in other applications including events such as live events, prerecorded events, plays, performances (such as ballet), remotely attended events, locally attended events (for example, with wearable haptic output devices), movies at an immersive theatre, and so forth.

Figure 3:
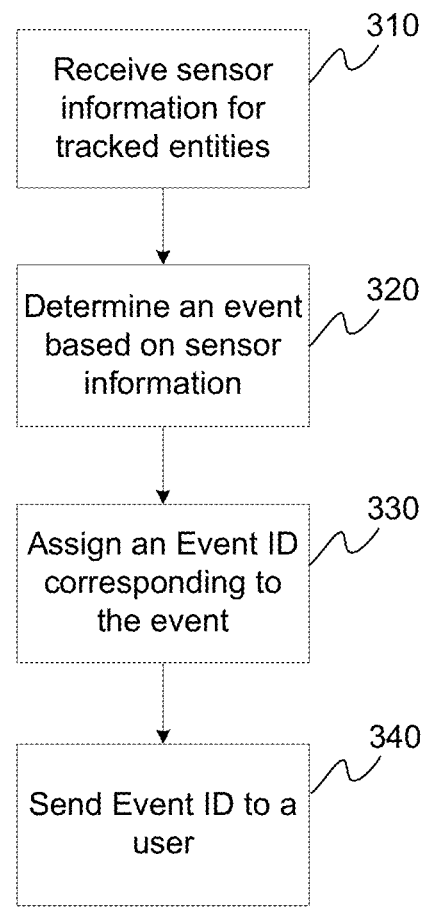
FIG. 3 is a flow diagram for providing event IDs in accordance with one embodiment.

FIG. 3 is a flow diagram for providing event IDs in accordance with one embodiment. In one embodiment, the functionality of the flow diagram of FIG. 3 (and FIGS. 4-5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 310, sensor information for tracked entities can be received. Sensor information can include information identifying the sensor or entity associated with the sensor and the sensor output, such as physical or environmental characteristics. At 320, sensor information can be used to determine an event based on the sensor information. For example, in a football game, sensor information from a particular sensor could be characterized to determine that the entity associated with the sensor tackled a football carrier. In another example, in a tennis match, a smart racquet can contain various sensors and connectivity to be able to detect and classify a hit. The smart racquet can detect whether the tennis ball hits on a player's racquet's "sweet spot" and associate that kind of hit with an event ID.

Figure 8:
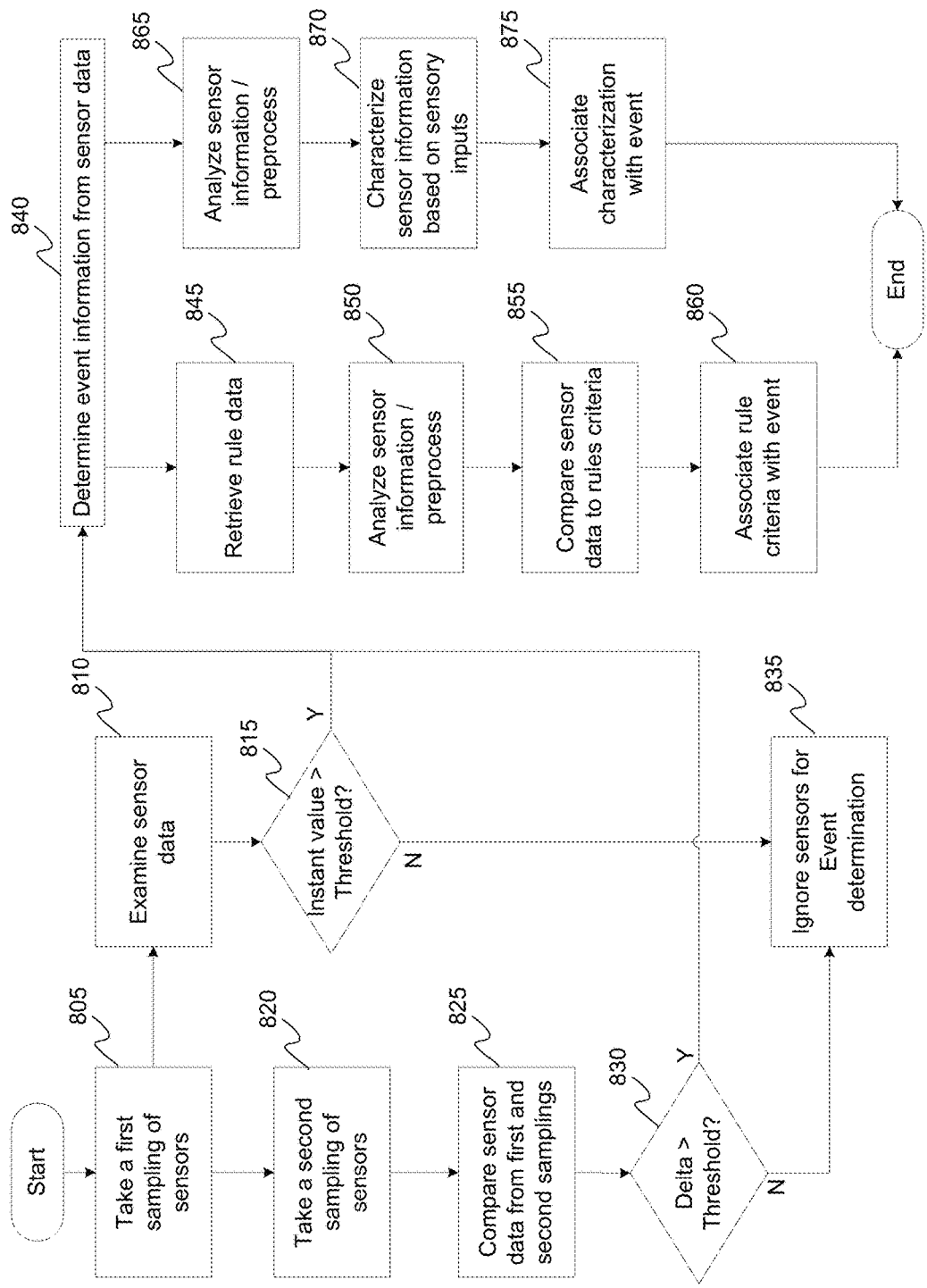
FIG. 8 is a flow diagram for determining an event based on sensor information in accordance with one embodiment.

Turning next to FIG. 8, FIG. 8 is a flow diagram for determining an event based on sensor information (e.g., as diagram element 320) in accordance with one embodiment. Sensor information can include multiple sensors assigned to multiple entities. Some of the entities can be stationary, such as a barrier sensor on a field line or goal. Some of the entities can be in motion, such as players or equipment in motion. At 805, a first reading of sensors can be taken. The data from sensors can be gathered and stored. In some embodiments, sensor data can be polled from sensors. In some embodiments, sensors can actively send sensor data at intervals, e.g., at a sample rate. Stored sensor data can be stored indefinitely, e.g., in non-volatile memory, or can be stored temporarily, e.g., in a cache memory.

At 810, sensor data can be examined. In particular, some sensors may have instantaneous sensor information (i.e., sensor samplings) that provide a meaningful instantaneous value. For example, an accelerometer can provide an instantaneous value that is a value of its acceleration. Other sensors may require monitoring over time to see how their values change. For example, position sensor information may show a change in location over time from which movement can be deduced. Sensors can provide information useful in both contexts as well. For example, an accelerometer's readings can provide useful information in analyzing the changes from one sample to another. At 815, for sensors providing useful instantaneous values, these values can be compared to a threshold value for that sensor. For example, an accelerometer sensor on a ball can provide an instantaneous value indicating the ball is accelerating at a value in an azimuth angle (such as an X or Y angle to the position of the accelerometer sensor). If this value is above a threshold value, then that could indicate event information for which a haptic response may be desired. If the value is less than the threshold value, then a haptic response may not be warranted (even if some event could possibly be associated with the value). Thus, if the value meets the threshold value, the flow will continue to 840, otherwise the flow will continue to 835.

In addition to instantaneous values, sensors can provide values that can be compared from one sensor sample to the next. For example, a position sensor could be compared from one sample to the next to determine velocity. At 820, a second sampling of the sensors can be taken. The data from sensors can be gathered and stored. In some embodiments, sensor data can be polled from sensors. In some embodiments, sensors can actively send sensor data at periodic sampling intervals. Stored sensor data can be stored indefinitely, e.g., in non-volatile memory, or can be stored temporarily, e.g., in a cache memory. At 825, the data from the first and second readings can be compared. In other words, data provided by a sensor in one sample can be compared to the data provided by the same sensor in another sample. One of skill will understand that a second sample of the sensors may not necessarily be the next available sample for purposes of comparison. Also, the flow elements of 805, 810, and 815 can be repeated as needed to provide meaningful comparisons over time. For example, a temperature sensor may not change quickly but a change from one temperature to another temperature in an hour may meet a threshold value (or condition).

At 830, the comparison values between sensor data samples are compared to a threshold value. For example, the difference in the samples can be compared to a threshold value. In some embodiments, sensor comparisons may not be a direct difference, but some other statistical measure that is compared to a threshold value. The threshold value (or condition) can also account for a measure of time. For example, a threshold value (or condition) may be met if a temperature sensor rises 5 degrees within an hour. In another example, a threshold value (or condition) may be met if the standard deviation of sample values varies by more than 10% over any 50 consecutive samples.

If the threshold value is not met then flow continues to 835. At 835, the sensor information is ignored for event determination. Of course, it may be useful to keep the sensor information for future consideration.

If the threshold value is met, then the flow continues to 840. At 840, event information will be determined from the sensor data. Two example tracks are shown for how event information can be determined. Other algorithms may be used to determine event information from the sensor data. The first example algorithm consistent with some embodiments can use a rules-based approach to examine sensor data to see if the data fits a certain rule. In some embodiments, rather than "rules," "patterns" can be used, such as would be used in a pattern matching or predictive-analysis-type algorithm At 845, rule data is retrieved. Rule data can be specific to the type of live event taking place (e.g., football game, tennis game, presidential debate, etc.). In some embodiments, a core set of rules can be developed that can be generalized to any live event. In some embodiments, rule data can be specific to or customized based on the participants (e.g., teams), location (e.g., stadium), time (e.g., night), date or season (e.g., winter), a sensor information input (e.g., temperature), and so forth. Rule data can specify value ranges for sensor data for particular sensor types and tie value ranges for one or more sensors to a particular event. For example, one rule can be that if sensor x=1, sensor y=5, and sensor z=10, then set event ids 4, 5, and 6. In this example, sensor x might be associated with a ball, sensor y with a first player, and sensor z with a second player; event ids 4, 5, 6, and 7, might correspond to first player kickoff, team 1 kick, second player receive, team 2 receive, respectively.

In embodiments where pattern matching is used, patterns can be used by modeling known actions. For example, sensors can be placed on entities, such as players and equipment, and data from the sensors be taken for known events and associated with such events, thereby developing a pattern profile for different events. Pattern profiles can be matched to future sensor data to determine one or events for a detected pattern in the future sensor data.

At 850, sensor information can be analyzed. Whereas sensor information that will not match to any rules or patterns can be disregarded, sensor information that serves as a foundational basis for several rules can be highlighted or preprocessed for easier use. For example, an accelerometer reading can be preprocessed to be downsampled, upsampled, or converted into an absolute value. In some embodiments, a sensor value can be preprocessed for finding a condition of interest which can trigger analyzing other sensor values. For example, if an acceleration value is greater than a first threshold value, a hit can be detected in preprocessing and gyroscope and other acceleration values can be stored for further rules analysis or pattern analysis. At 855, sensor information can be compared to the rules criteria.

At 860, the rules can be associated with events. For example, the following table tracks rules to events.

TABLE 1

| Rule ID | Event |
| --- | --- |
| 1 | Team 1 score |
| 2 | Team 2 score |
| 3 | Player A score |
| 4 | Player B score |
| . | |
| . | |
| . | |
| N-1 | Tackle of Player A |
| N | Tackle of Player B |

Rule criteria can meet multiple events. For example, in Table 1, if Rule ID 3 is met, then one of Rule ID 1 or 2 will also be met (assuming a team sport with two teams).

Another example algorithm for determining event information from sensor data consistent with some embodiments can use a characterization-based approach to examine sensor data to characterize it into an event. At 865, sensor information can be analyzed. In some embodiments, this can include preprocessing the data, such as described above in connection with 850. At 870, the sensor information can be characterized based on the sensory inputs. Sensory inputs can be characterized into event information where the event can be directly represented by a haptic effect rather than a live event. In other words, a paradigm can be used to evaluate sensory inputs into haptic signal events rather than on-the-field events or at-the-venue events. The idea here is to approximate a direct translation of input sensory signals into a subset of event data for haptic output. The instantaneous sensor information or comparison sensor information can be classified into different ranges, each range corresponding to a particular haptic response. For example, an accelerometer sensor on a ball can have a range defined for instantaneous sensor values of 5-10, 10-15, 15-20, and so on. If an accelerometer outputs a value 12, then it would fall into the second range. At 875, the characterization can be associated with an event. Continuing the example, the second range can have a haptic event associated with it that would provide a certain haptic effect. Thus, the granularity of the sensor data can be reduced into events, which in turn can be associated with event IDs, as further described below.

One example of the flow of FIG. 8 can include sensing an event relating to a tennis racquet. A sensor such as sensor 20 can be an IMU containing an accelerometer, gyroscope, and magnetometer. The acceleration and gyroscope measurement readings can be analyzed to determine an event involving the tennis racquet. The sensor readings can be used to classify the tennis racquet hitting a ball into events such as backhand shot, forehand shot, sweetspot hit (center of the racquet), and/or edges hit (edges of the racquet). For example, a hit could be classified into a forehand shot on the sweetspot of the racquet. Event IDs can be assigned to these events as described below, and eventually a haptic effect can be played on a haptic output device of a user's device.

Classifying a hit can start with hit detection, such as in 865. Preprocessing, such as described above, can convert acceleration values in the y-direction into absolute values, since only the absolute values need be considered. If y-acceleration is greater than a first threshold value, a hit is detected, such as in 870. Gyroscope and acceleration values can be stored. Further preprocessing can sample the data of the z-acceleration values to determine a minimum value reached immediately following the detection of the y-acceleration exceeding the first threshold value, such as in 850. Establishing a minimum value will allow a comparison of values within a minimum to maximum range of values to different threshold values to characterize the event. Sensor values will vary depending on the nature of the hit.

Figure 9:
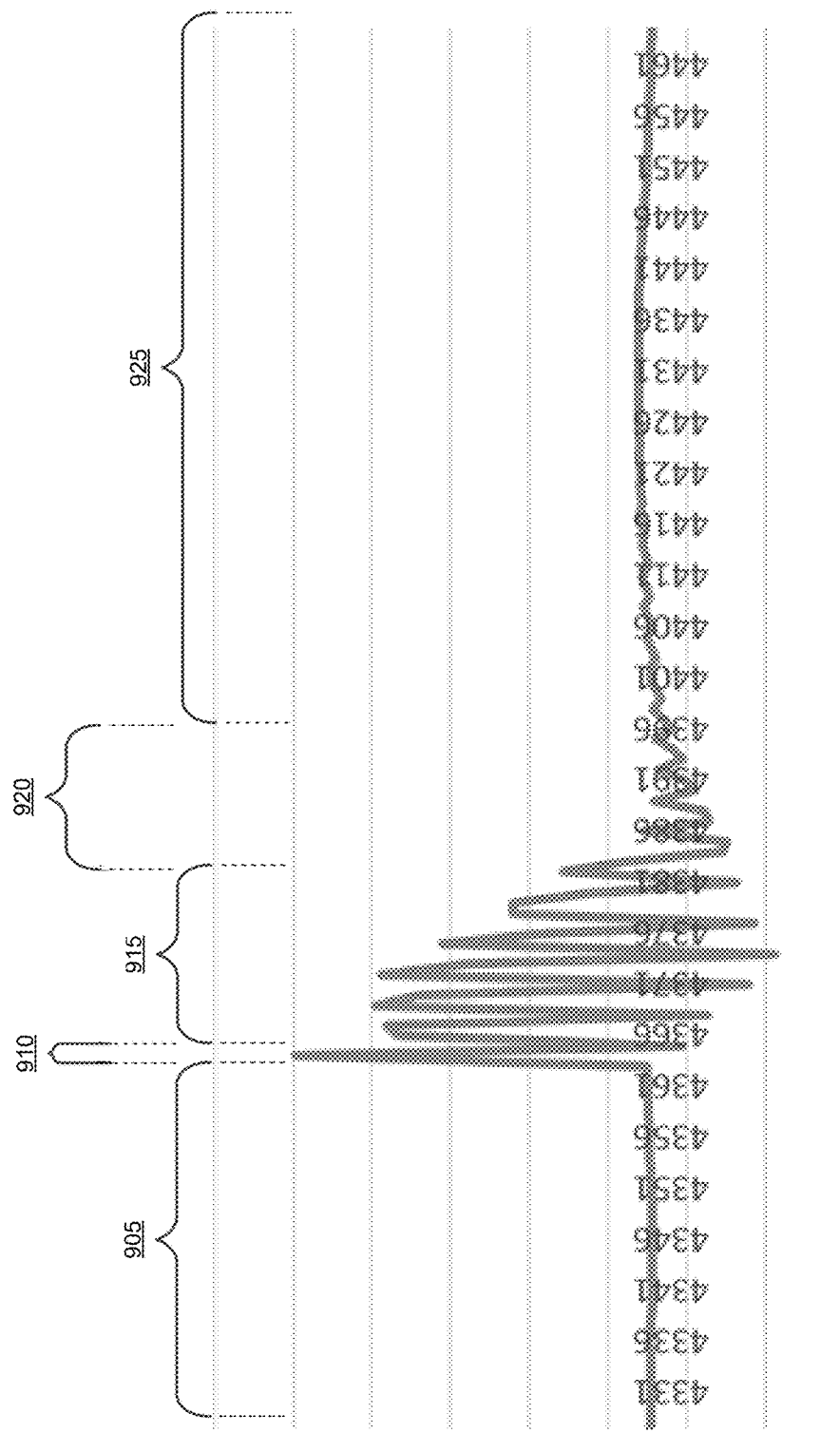
FIG. 9 shows an example output of z-acceleration values that can be sampled following a hit.

FIG. 9 shows an example output of z-acceleration values that can be sampled following a hit. Time period 905 precedes the hit. At time 910, an instantaneous value shows a high peak maximum value. In the y-acceleration direction a similar response value can exceed a threshold value and trigger further sampling of sensor data. At time period 915, sensor values for z-acceleration are slightly attenuating. At time period 920, the racquet is nearly back to normal, with z-acceleration values being nearly zero. At time period 925, the racquet is no longer vibrating as a result of the hit. The time period from 905 to 925 can take place within 100 ms.

The event can be classified using the available values of the sensor, including those discussed above and values from the gyroscope axes. For example, the events as described above can be sensed by implementing a procedure, such as in 855 and 860, as outlined by the following pseudocode:

```
If (hitOccured (i.e., y-acceleration > threshold value 1))
    If (Gyroscope x value at hit < threshold value 2)
        Backhand hit
    Else If (Gyroscope x value at hit > threshold value 3)
        Forehand hit
    If (z-accelerationMinimum value > threshold value 4)
        Sweetspot hit
    Else If (z-accelerationMinimum value < threshold value 5)
        Edge spots hit.
```

As found in the pseudocode, a z-acceleration minimum value found from preprocessing allows the detection of sweetspot versus edge location of a hit, as each data pattern that occurs beginning immediately after the hit is different. The differences can be modeled and using patterns from the modeling, the values for thresholds 4 and 5 can be determined to deduce the hit location. Likewise, values for thresholds 2 and 3 relating to the gyroscope x axis value can be found using modeling to determine whether the hit is a forehand or backhand hit.

Hit intensity can also affect the haptic effect that is eventually output on a haptic output device. To find whether the hit was "soft," "medium," or "hard" a function of one or more of the acceleration parameters on the axes of the sensor can be compared to a soft threshold value and a hard threshold value. If the parameters indicate the hit was below the soft threshold value, the intensity of the hit can be classified as soft. If the parameters indicate the hit was above the hard threshold value, the intensity of the hit can be classified as hard. Otherwise the intensity of the hit can be classified as medium.

The following pseudocode illustrates one way of assigning an hit ID using the hit intensity as another parameter of the characterization of the event.

```
If (SoftHit and SweetSpot)
    hitID = 1
else if (SoftHit and Edges)
    hitID = 2
else if (hardHit and SweetSpot)
    hitID = 3
else if (hardHit and SweetSpot)
    hitID = 4
else
    hitID = 0
```

The hit ID can be translated into an event ID. Forehand or Backhand can also be added to create other hitIDs.

One of skill in the art will understand that different sensors and different applications would call for different events and event modeling than laid out above for a tennis racquet hit. The nature of the activity will dictate what sensor values are evaluated and what threshold values are found to model or pattern match event activities. In some embodiments, a human operator can choose which sensors or data streams associated with which sensors should be used given the nature or type of activity being evaluated. In some embodiments, artificial intelligence techniques can be used by observing all data and choosing data of interest given some criteria, such as a level of information entropy.

As described above, preprocessing can be used to highlight or adjust data prior to evaluation against a threshold value. Preprocessing can also be useful when more data points (or sensor parameters) are needed to determine an event ID for a detected event, such as a hit. For example, as available data bandwidth of sensor information is lower, additional preprocessing can consider additional parameters to analyze sensor information. In another example, a sensor could be providing scarce data. Preprocessing can analyze other parameters to examine the relationship between different sensor's values. For example, a current value for acceleration in the y direction can be compared to a past value for acceleration in the y direction. The same can be done for acceleration in the z direction. If the z axis is more prominent, the z acceleration value can be substituted in the preprocessing step to determine a hit. The relationship between current sensor data and previous sensor data can indicate which axis is most affected by a hit. If scarce data prevents from detecting the hit on one axis, it could be detected on another axis using its acceleration values. Sensor data might be scarce in the expected direction because the sensor may be malfunctioning, misaligned, or the equipment may be used in an unexpected fashion.

Turning back to FIG. 3, at 330, an event ID can be assigned to the event that was determined from the sensor information. The event ID could be an ID that indicates a particular event associated with a specific type of live event, like a football game. In some embodiments, the event ID can indicate a generic type of desired haptic feedback, such as an event ID that corresponds to activating a vibrotactile actuator at a 75% intensity level for 500 ms. The event ID can result from a transformation of N input sensory signals, such as acceleration (x, y, z), gyroscope (x, y, z), magnetometer (x, y, z), etc., into M outputs to classify an event ID.

At 340, the event ID is sent to a haptically-enabled device of a user. As described below, the event ID may be accompanied by other processing before it reaches the user.

Figure 4:
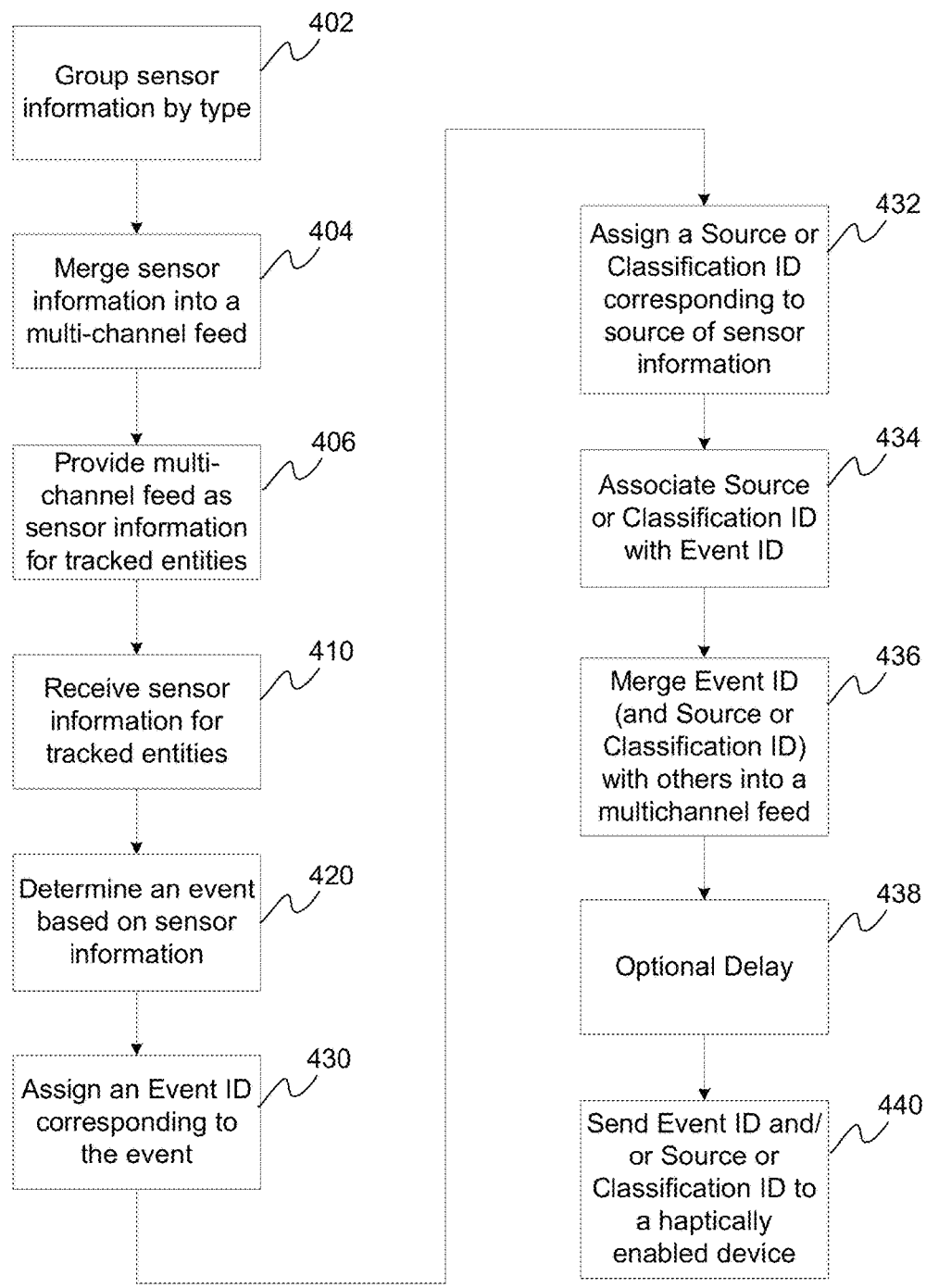
FIG. 4 is a flow diagram of providing event IDs in accordance with one embodiment.

FIG. 4 is a flow diagram of providing event IDs in accordance with one embodiment. At 402, sensor information can be grouped by classification or source. A classification or source can correspond to the entity or type of entity from which sensor information is received. For example, the classification or source of an entity can be a player, team, person, object, ball, goal, boundary, referee, and so forth. Multiple sensors can also be associated with one entity. For example, multiple sensors can be placed on a player and all associated with that one player. At 404, sensor information can be merged into a multi-channel feed. A sensor interface such as sensor interface 21 can receive all the sensor information and group it. The sensor interface can be in proximity to the sensors (i.e., local to the event) and merge the sensor information into a multi-channel feed. In some embodiments, the sensor interface can be located remotely (i.e., remote from the event). At 406, the multi-channel feed can be provided as merged sensor information to an event process server.

At 410, sensor information for tracked entities can be received. Sensor information can include identity information for identifying the sensor or entity associated with the sensor and can include the sensor output, such as physical or environmental characteristics as measured by the sensor. At 420, sensor information can be used to determine an event based on the sensor information. The flow of FIG. 8 can be used to determine an event, as described above. For example, in a football game, sensor information from a particular sensor can be characterized to determine that an entity associated with the sensor is a player tackling a football carrier. At 430, an event ID can be assigned to the event that was determined from the sensor information. The event ID can be an ID that indicates a particular event associated with a specific type of live event, like a football game. In some embodiments, the event ID can indicate a generic type of desired haptic feedback, such as an event ID that corresponds to activating a vibrotactile actuator at a 75% intensity level for 500 ms.

At 432, one or more optional classification or source IDs can be assigned to the event. For example, a player dunking a basketball can be assigned a classification or source ID for the identification of the player and a classification or source ID for the team the player is on. "Classification" or "source" can be substituted for the classification or source of the thing. For example, the classification or source ID could be "player ID," "team ID," "goal ID," "hole ID," "object ID," "boundary ID," and so forth. At 434, one or more classification or source IDs can be associated with the event ID. Classification or source information can include optional force information. Force information can be an absolute parameter indicating an intensity that the haptic effect should be played (e.g., low, medium, hard), or it can be a variance parameter indicating an intensity that the haptic effect should be varied from a baseline intensity for the haptic effect (e.g., lower, harder, much harder). The event ID can be based on a transformation of N input sensory signals, such as acceleration (x, y, z), gyroscope (x, y, z), magnetometer (x, y, z), etc., into M outputs to classify an event ID, force, player, team, and so forth.

At 436, event IDs (and optional classification or source IDs) can be merged into a multichannel feed. At 438, optional delay can be used prior to sending the feed, such as discussed above with regard to FIG. 7. At 440, event IDs (and optional source or classification IDs) can be sent to a user. In some embodiments, the feed can be broadcast with audio and video for a live event. In other embodiments, the feed can be transmitted using other wired or wireless technology.

Figure 5:
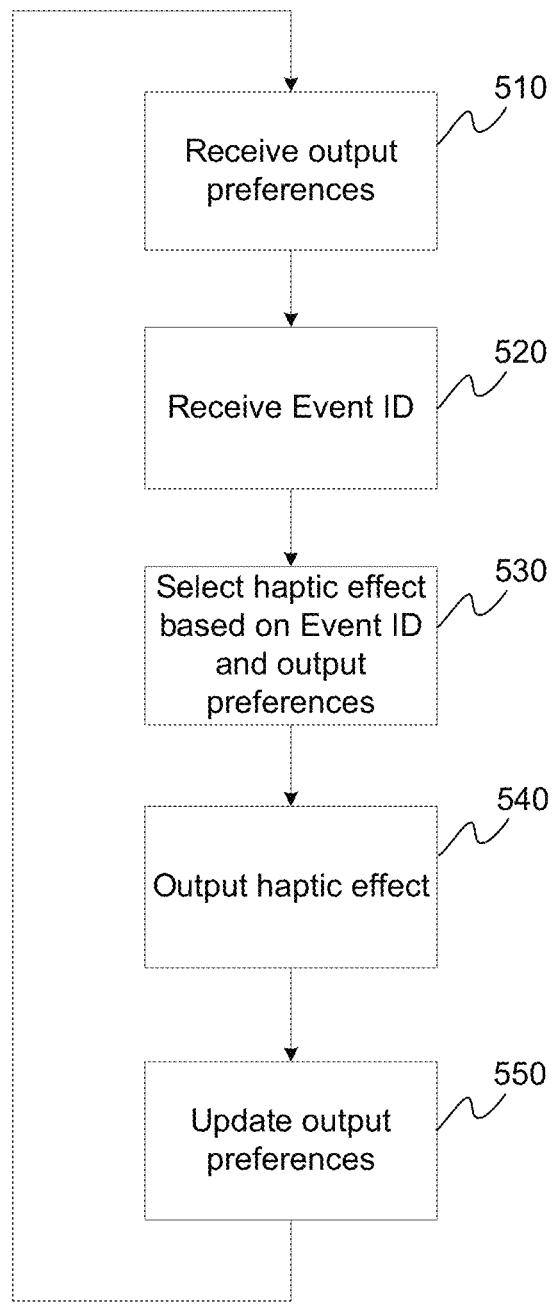
FIG. 5 is a flow diagram of providing haptic output at a haptic output device in accordance with one embodiment.

FIG. 5 is a flow diagram of providing haptic output at a haptic output device in accordance with one embodiment. At 510, output preferences for a user can be received. In some embodiments, output preferences can include preferred event IDs. In some embodiments, output preferences can include preferred classifications or sources for filtering event IDs by a corresponding classification or source ID. At 520, event IDs can be received. In some embodiments, event IDs are received at process server 28, which can be a standalone machine, part of system 210, or part of a receiving device, such as a network device. At 530, a haptic effect is selected based on one or more event IDs. In some embodiments, output preferences can provide filtering so that only certain event IDs are received at processor 212. In other embodiments, event IDs and optional classification or source IDs can be received at processor 212 for filtering. In some embodiments, output preferences can allow the user to enable or disable different haptic channels provided by event process server 22, where each haptic channel corresponds to an event ID. Processor 212 can use module 222 to determine which haptic effect to output based on the event ID. Module 222 can include a lookup table that associates the event ID and optional classification or source IDs (such as a team ID or player ID) with a particular haptic effect, as in the following table:

TABLE 2

| Event ID | Haptic Effect |
| --- | --- |
| 1 | Effect 1 (force, team, player) |
| 2 | Effect 2 (force, team, player) |
| . | |
| . | |
| . | |
| N | Effect N (force, team, player) |

In some embodiments, the force element can be a separate parameter, specified as metadata to the event ID, or in some embodiments, the event ID can specify a separate force parameter, such as in Table 3.

TABLE 3

| Event ID | Haptic Effect | Force of the effect |
| --- | --- | --- |
| 1 | Effect 1 (team, player) | Force |
| 2 | Effect 2 (team, player) | Force |
| . | | |
| . | | |
| . | | |
| N | Effect N (team, player) | Force |

Team and Player can serve as filters. If a user receives event IDs 1 and 2 at the same time and ID 1 has team specified as Team A and ID 2 has team specified as Team B, and the output preferences enable Team A and disable Team B, only the effect for ID 1 will be output (Effect 1).

At 540, the selected haptic effect is outputted on the haptic output device 218. At 550, a user can optionally update output preferences. For example, output preferences can be updated to focus on a different classification or source by changing event ID filtering to adjust based on the updated output preferences. Updating output preferences can cause a different event ID to be selected, even if the event giving rise to the event ID is substantially similar to another event where one event ID was selected. For example, for a touchdown score in a football game, haptic feedback for the scoring team may be designed to be "cheerful" feeling, high-frequency vibrotactile feedback, whereas haptic feedback for the non-scoring team may be designed to be "negative" feeling, low-frequency vibrotactile feedback. Two Event IDs can be sent, one for each type of feedback, each specifying classification or source IDs corresponding to the two respective teams. The output preferences for one team would provide feedback corresponding to one event ID whereas output preferences specifying the other team would provide feedback corresponding to a different event ID. The resulting haptic feedback would be different for each event ID even though the event generating the event IDs is the same, i.e., the touchdown.

In one example embodiment of system 10, a user can watch a Los Angeles Lakers basketball game on a device 30 such as a tablet. Suppose the user is an avid Lakers fan. He enables haptic effects for the live game and specifies preferences to receive haptic feedback based on the Lakers moves. As the Lakers play, entity sensors 20 provide sensor information from sensor IDs associated with the different entities on the court, such as goals, players, boundaries, officials, the ball, and so forth. System 10 can receive the sensor information 20 and determine an event based on the sensor information. Such events may include ball related events, such as dribbling, shooting the ball, scoring, and so forth, or player related events, such as blocking, running, jumping, and so forth. Each of the events can be classified by the source of the entity or entities associated with the event, so that all the events associated with the Lakers are classified as such. An event ID and source ID can be assigned to the events. All of the event IDs and source IDs can be sent to a haptically-enabled device, such as the user's tablet.

The user's tablet can receive the event IDs and filter them so that only the event IDs that also have a source ID for the Lakers are used. A haptic effect can be selected for each of the event IDs that correspond to the Lakers. The haptic effect can be played on the tablet. This can all happen so that the event IDs are processed at the same time as the video feed to align the haptic effect with the video on the screen.

After half-time, the user can decide to focus more on a particular player, such as Kobe Bryant. The user enables haptic effects just for that player. System 10 can respond by filtering on source IDs corresponding to that player. Now the user will only receive haptic feedback based on what that player is doing.

In another example, another user watches a live tennis game. The user activates haptic effects for the game. The user can distinctively feel racquet hit effects of the players. She can feel the intensity and type of hit, making her more excited and immersed in the game. She later decides to enable haptic effects only for serving shots. She can feel the difference in the intensity of haptic effects between the player's first service attempt and second service attempt (where the player typically serves with less force in favor of better accuracy).

In another example, another user is streaming a live soccer game on his phone. The user is unable to view the screen because he is multitasking. The user puts the phone on his lap and enables haptic effects for when the ball is within striking distance of the goal and in the control of the potentially scoring team. He can then focus on his other work and not miss a goal in the game.

In another example, another user is streaming a live soccer game. The user can choose the type of haptic effect preferred when players shoot the ball using their feet or their heads. Customizing which haptic effects are played allows the user to have a unique experience.

As disclosed, embodiments provide a system for generating haptic effects for events based on an event ID. Sensors can gather information, send it to an event process server to determine an event ID, and event IDs can be provided to handheld or wearable devices for output on haptic output devices contained thereon. An event ID can correspond to a particular haptic effect so that haptic logic need not be provided directly from the event venue to the audience venue. Some embodiments specify a classification or source ID associated with the event ID that allows users to select haptic output to be provided based on characteristics of the source of the sensor information giving rise to the haptic effect.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating event identifiers (IDs), comprising:
   receiving sensor information that corresponds to at least one of (i) output signals generated in response to conditions sensed by sensors respectively on tracked entities, or (ii) identification of the sensors;
   determining an event based on the sensor information;
   assigning an event ID corresponding to the event; and
   sending the event ID to a haptically-enabled device for output of a haptic effect determined from the event ID,
   wherein the conditions include at least one of environmental conditions surrounding the tracked entities, movement of the tracked entities, orientation of the tracked entities, audio of the tracked entities, audio from an environment around the tracked entities, or biosensor data of the tracked entities.

2. The method of claim 1, further comprising:
   classifying the event based on an association of one or more of the tracked entities with the sensor information;
   assigning at least one classification ID to the event, wherein the at least one classification ID specifies a particular person or object associated with a respective one of the one or more tracked entities; and
   associating the at least one classification ID with the event ID.

3. The method of claim 2, wherein the sending further includes sending the at least one classification ID with the event ID for output of the haptic effect determined from the event ID and the at least one classification ID.

4. The method of claim 3, wherein
   the haptic effect is further determined from user preferences that specify a classification preference, and
   the method further comprises:
   when the at least one classification ID corresponds to the classification preference, selecting the event ID associated with the at least one classification ID.

5. The method of claim 2, further comprising:
   prior to the receiving of sensor information, grouping the sensor information by source;
   merging the sensor information into a multi-channel feed; and
   providing the multi-channel feed as the sensor information for the tracked entities.

6. The method of claim 1, further comprising:
   merging the event ID with other event IDs into a multi-channel feed.

7. The method of claim 6, wherein
   the sending further includes transmitting the multichannel feed to a second process server, and
   the second process server is configured to process the multichannel feed and provide one or more of the event ID and the other event IDs from the multichannel feed to the haptically-enabled device.

8. The method of claim 1, further comprising:
   prior to the sending of the event ID, delaying the sending by a time based on an intentional delay in a distribution of an audio/video signal associated with the event ID and a processing time of the event ID,
   wherein the audio/video signal is sent with the event ID to the haptically-enabled device.

9. A system for generating event identifiers (IDs), comprising:
   a sensor information interface configured to receive sensor information that corresponds to at least one of (i) output signals generated in response to conditions sensed by sensors respectively on tracked entities, or (ii) identification of the sensors;
   an event processing server configured to determine an event based on the sensor information, assign an event ID corresponding to the event, and send the event ID to a haptically-enabled device for output of a haptic effect determined from the event ID,
   wherein the conditions include at least one of environmental conditions surrounding the tracked entities, movement of the tracked entities, orientation of the tracked entities, audio of the tracked entities, audio from an environment around the tracked entities, or biosensor data of the tracked entities.

10. The system of claim 9, wherein the event processing server is further configured to:
    classify the event based on an association of one or more of the tracked entities with the sensor information,
    assign at least one classification ID to the event, wherein the at least one classification ID specifies a particular person or object associated with a respective one of the one or more tracked entities, and
    associate the at least one classification ID with the event ID.

11. The system of claim 10, wherein the event processing server is further configured to send the at least one classification ID with the event ID for output of the haptic effect determined from the event ID and the at least one classification ID.

12. The system of claim 11, further comprising:
    a second process server configured to determine the haptic effect from the event ID and from user preferences specifying a classification preference,
    wherein the second process server, when the at least one classification ID corresponds to the classification preference, selects the event ID associated with the at least one classification ID.

13. The system of claim 10, wherein:
    the sensor information interface is further configured to group the sensor information by source, merge the sensor information into a multi-channel feed, and provide the multi-channel feed as the sensor information for the tracked entities.

14. The system of claim 9, further comprising:
    an event ID merger configured to merge the event ID with other event IDs into a multichannel feed.

15. The system of claim 14, further comprising:
    a second process server configured to receive the multi-channel feed, process the multichannel feed, and provide one or more event IDs to the haptically-enabled device.

16. The system of claim 9, wherein the event processing server is further configured to:
    prior to the event ID being sent to the haptically-enabled device, delay the event ID from being sent by a time based on an intentional delay in a distribution of an audio/video signal associated with the event ID and a processing time of the event ID,
    wherein the audio/video signal is sent with the event ID to the haptically-enabled device.

17. A method of generating a haptic effect from an event identifier (ID), comprising:
    receiving a selection of output preferences from a user;

receiving an event ID, the event ID being determined based on an event, the event being determined based on sensor information that corresponds to at least one of (i) output signals generated in response to conditions sensed by sensors respectively on tracked entities, or (ii) identification of the sensors;

selecting a haptic effect based on the event ID and the output preferences; and outputting the haptic effect on a haptic output device, wherein the conditions include at least one of environmental conditions surrounding the tracked entities, movement of the tracked entities, orientation of the tracked entities, audio of the tracked entities, audio from an environment around the tracked entities, or biosensor data of the tracked entities.

18. The method of claim 17, further comprising:
receiving with the event ID, a classification ID based on an association of one or more of the tracked entities with the sensors.

19. The method of claim 18, wherein
the output preferences specify a classification, and
when the classification ID corresponds to the classification, the selecting of a haptic effect is based on the classification ID.

20. The method of claim 17, wherein:
the event ID is selected from a multichannel feed with other event IDs, the selecting being based on the output preferences.

21. The method of claim 20, further comprising:
updating the output preferences so as to cause a different event ID to be selected from the multichannel feed.

22. A system of generating a haptic effect from an event identifier (ID), comprising:
a device configured to receive a selection of output preferences from a user,
receive an event ID, wherein the event ID is determined based on an event, wherein the event is determined based on sensor information that corresponds to at least one of (i) output signals generated in response to conditions sensed by sensors respectively on tracked entities, or (ii) identification of the sensors,
select a haptic effect based on the event ID and the output preferences, and
output the haptic effect on a haptic output device,
wherein the conditions include at least one of environmental conditions surrounding the tracked entities, movement of the tracked entities, orientation of the tracked entities, audio of the tracked entities, audio from an environment around the tracked entities, or biosensor data of the tracked entities.

23. The system of claim 22, wherein the device is further configured to:
receive with the event ID, a classification ID based on an association of one or more of the tracked entities with the sensors.

24. The system of claim 23, wherein
the output preferences specify a classification, and
when the classification ID corresponds to the classification, the device is configured to select the haptic effect based on the classification ID.

25. The system of claim 22, wherein:
the event ID is selected from a multichannel feed with other event IDs, the selecting being based on the output preferences.

26. The system of claim 25, further comprising:
updating the output preferences so as to cause a different event ID to be selected from the multichannel feed.

* * * * *